US011482718B2

(12) United States Patent
Kemmer et al.

(10) Patent No.: US 11,482,718 B2
(45) Date of Patent: Oct. 25, 2022

(54) METHOD FOR DETECTING A LEAK IN AN ENERGY CONVERTER SYSTEM

(71) Applicant: Robert Bosch GmbH, Stuttgart (DE)

(72) Inventors: Helerson Kemmer, Vaihingen (DE); Johannes Schild, Abstatt (DE)

(73) Assignee: Robert Bosch GmbH, Stuttgart (DE)

( * ) Notice: Subject to any disclaimer, the term of this patent is extended or adjusted under 35 U.S.C. 154(b) by 380 days.

(21) Appl. No.: 16/494,438

(22) PCT Filed: Feb. 14, 2018

(86) PCT No.: PCT/EP2018/053654
§ 371 (c)(1),
(2) Date: Sep. 16, 2019

(87) PCT Pub. No.: WO2018/166734
PCT Pub. Date: Sep. 20, 2018

(65) Prior Publication Data
US 2021/0119233 A1    Apr. 22, 2021

(30) Foreign Application Priority Data

Mar. 14, 2017   (DE) .................... 10 2017 204 202.8

(51) Int. Cl.
*H01M 8/04664* (2016.01)
*H01M 8/04089* (2016.01)
(Continued)

(52) U.S. Cl.
CPC .......... *H01M 8/04664* (2013.01); *G01N 7/00* (2013.01); *H01M 8/04089* (2013.01);
(Continued)

(58) Field of Classification Search
CPC ......... H01M 8/04664; H01M 8/04089; H01M 8/04231; H01M 8/04388; H01M 8/04425;
(Continued)

(56) References Cited

U.S. PATENT DOCUMENTS

2004/0081864 A1    4/2004  Herrmann
2005/0277010 A1   12/2005  Lamont et al.
(Continued)

FOREIGN PATENT DOCUMENTS

CN    101233641 A    7/2008
CN    101331638 A   12/2008
(Continued)

OTHER PUBLICATIONS

International Search Report for Application No. PCT/EP2018/053654 dated May 11, 2018 (English Translation, 2 pages).

*Primary Examiner* — Toan M Le
*Assistant Examiner* — Xiuqin Sun
(74) *Attorney, Agent, or Firm* — Michael Best & Friedrich LLP

(57) ABSTRACT

The invention relates to a method for detecting a leak in an energy converter system (1) containing a gas. A pressure regulator (3) is used to regulate a gas pressure in the energy converter system (1), and the pressure regulator (3) has a gas metering valve (4). The method has the following steps: a. measuring an inlet pressure (10) of the pressure regulator (3) and measuring an outlet pressure (12) of the pressure regulator (3), b. measuring an output variable (16) of the energy converter system (1) and calculating a gas requirement in the energy converter system (1) on the basis of the output variable (16) of the energy converter system (1), c. determining a first calculated flow (20) through the pressure regulator (3) on the basis of the measured inlet pressure (10) of the pressure regulator (3) and the measured outlet pressure (12) of the pressure regulator (3), d. determining a second calculated flow (22) through the pressure regulator (3) on the basis of the gas requirement, e. comparing the first calculated flow (20) with the second calculated flow (22) by generating a first comparison value (24) from the first calculated flow (20) and the second calculated flow (22), and (Continued)

f. determining a first threshold (26) and generating an error signal (32) if the value of the comparison value (24) is greater than the first threshold (26).

9 Claims, 2 Drawing Sheets

(51) Int. Cl.
    *H01M 8/04223*    (2016.01)
    *H01M 8/0438*    (2016.01)
    *H01M 8/04537*    (2016.01)
    *G01N 7/00*    (2006.01)

(52) U.S. Cl.
    CPC ... *H01M 8/04231* (2013.01); *H01M 8/04388* (2013.01); *H01M 8/04425* (2013.01); *H01M 8/04432* (2013.01); *H01M 8/04582* (2013.01); *G01N 2223/647* (2013.01)

(58) Field of Classification Search
    CPC .......... H01M 8/04432; H01M 8/04582; G01N 7/00; G01N 2223/647
See application file for complete search history.

(56) References Cited

U.S. PATENT DOCUMENTS

| | | |
|---|---|---|
| 2006/0260692 A1 | 11/2006 | Pechtold |
| 2008/0141760 A1 | 6/2008 | Sienkowski et al. |
| 2009/0035612 A1* | 2/2009 | Suematsu ........... H01M 16/006 |
| | | 429/432 |

FOREIGN PATENT DOCUMENTS

| | | | |
|---|---|---|---|
| CN | 101356680 | A | 1/2009 |
| CN | 101556311 | A | 10/2009 |
| CN | 101728556 | A | 6/2010 |
| CN | 102288370 | A | 12/2011 |
| CN | 103748722 | A | 4/2014 |
| CN | 104025359 | A | 9/2014 |
| DE | 10231208 | | 1/2004 |
| DE | 10314024 | A1 | 10/2004 |
| DE | 102006023433 | | 11/2006 |
| DE | 102012005690 | A1 | 9/2013 |
| JP | 2003148252 | A * | 5/2003 |
| JP | 2005257340 | | 9/2005 |
| JP | 2006179469 | A | 7/2006 |
| JP | 2006294255 | A | 10/2006 |
| WO | 2007069010 | | 6/2007 |

* cited by examiner

METHOD FOR DETECTING A LEAK IN AN ENERGY CONVERTER SYSTEM

BACKGROUND OF THE INVENTION

The invention relates to a method for detecting a leak in an energy converter system containing a gas, wherein a pressure regulator is used for closed-loop control of a gas pressure in the energy converter system and the pressure regulator comprises a gas metering valve.

Particularly in the case of energy converter systems such as fuel cells that contain a hazardous substance such as hydrogen, the tightness of the energy converter system is of great importance.

A fuel cell is a galvanic cell which converts the chemical reaction energy of a continuously supplied fuel and of an oxidation means into electrical energy. Thus, a fuel cell is an electrochemical energy converter. In known fuel cells, in particular, hydrogen ($H_2$) and oxygen ($O_2$) are converted into water ($H_2O$), electrical energy and heat.

An electrolyzer is an electromechanical energy converter which cleaves water ($H_2O$) by means of electrical energy into hydrogen ($H_2$) and oxygen (O).

Among others, proton exchange membrane (PEM) fuel cells are known. Proton exchange membrane fuel cells comprise a centrally arranged membrane that is transmissive to protons, i.e., to hydrogen ions. The oxidation means, more particularly air oxygen, is spatially separated from the fuel, in particular hydrogen, as a result thereof.

Further, proton exchange membrane fuel cells comprise an anode and a cathode. The fuel is supplied at the anode of the fuel cell and catalytically oxidized to protons under the emission of electrons. The protons reach through the membrane to the cathode. The emitted electrons are removed from the fuel cell and flow to the cathode via an external circuit.

The oxidation means is supplied to the fuel cell at the cathode and it reacts to give water by taking up the electrons from the external circuit and protons that have reached the cathode through the membrane. The water arisen thus is removed from the fuel cell. The gross reaction is:

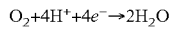
$$O_2 + 4H^+ + 4e^- \rightarrow 2H_2O$$

Here, there is a voltage between the anode and the cathode of the fuel cell. In order to increase the voltage, a plurality of fuel cells can be mechanically arranged in succession to form a fuel cell stack and said fuel cells can be electrically interconnected. A fuel cell stack is also referred to as a stack.

Mechanical, passive pressure reducers and pressure regulators are often used in energy converter systems containing gas; use is increasingly also made of gas metering valves that are controlled by means of pulse width modulation.

Energy converter systems may comprise a control unit comprising a pressure regulator. Pressure regulators usually have an input pressure on the input side and an output pressure on the secondary side. In general, the output pressure of the pressure regulator, which preferably corresponds to an anode pressure when the pressure regulator is used in fuel cells, is measured and set to an intended value by means of a controller of the control unit.

The output pressure of the pressure regulator on the secondary side reduces without further metering of gas on account of gas sinks. The gas sinks can be of different types and are, in particular, caused by a gas consumption such as the consumption of hydrogen in a fuel cell as a result of a transfer of the hydrogen through the proton exchange membrane (PEM) to the cathode, by purging by means of a purge valve or a drain valve, or else by leaks in the energy converter system. Gas outflows through the purge valves or drain valves are ascertainable from known properties of the employed valves. By way of example, the gas consumption is directly ascertainable in a fuel cell from measuring the current produced. The leaks in the energy converter system often cannot be ascertained in satisfactory fashion.

Leaks in energy converter systems are usually ascertained, for example, by cyclical endurance tests or by external gas sensors, in particular by hydrogen sensors outside of the fuel cell, more particularly above the fuel cell, in the case of fuel cells.

DE 10 2006 023 433 A1 describes a pressure regulator that comprises a plurality of valve stages for increasing the reduction ratio of the regulator and that has a particular application for an anode input side of a fuel-cell system. Closed-loop pressure control is implemented by means of a flow control pressure regulator, wherein a membrane arrangement with a double membrane is provided. If a first membrane passes hydrogen, the leak can be detected before the hydrogen reaches the second membrane and the air side of the pressure regulator.

DE 102 31 208 A1 describes a method and an apparatus for examining a fuel-cell system. The method and the apparatus, respectively, are designed to check whether the fuel-cell system is gas-tight on the anode side and/or cathode side and/or to check whether there is a leak between the anode side and the cathode side of the fuel-cell system. A test mixture is supplied to the anode side of the fuel-cell system and an observation is carried out as to whether the filled test pressure impermissibly reduces over time when the valve is closed. By way of example, this is performed by means of a pressure sensor that may be connected to an external controller. Furthermore, a flow measuring device can be used to check for leaks, with the fuel-cell system being filled to a certain test pressure and then the flow measuring device being used to measure whether test gas subsequently flows to keep the test pressure at the set level.

A disadvantage of the methods of the prior art is that separate pressure tests have to be carried out outside of the desired operation and/or that additional gas sensors are required.

SUMMARY OF THE INVENTION

A method is provided for detecting a leak in an energy converter system containing gas, wherein a pressure regulator is used for closed-loop control of a gas pressure in the energy converter system, the pressure regulator comprises a gas metering valve and the method comprises the following steps:

a. measuring an input pressure of the pressure regulator and measuring an output pressure of the pressure regulator, b. measuring an output variable of the energy converter system and calculating a gas requirement in the energy converter system on the basis of the output variable of the energy converter system, c. determining a first calculated flow through the pressure regulator on the basis of the measured input pressure of the pressure regulator and the measured output pressure of the pressure regulator, d. determining a second calculated flow through the pressure regulator on the basis of the gas requirement, e. comparing the first calculated flow with the second calculated flow by forming a first comparison value from the first calculated flow and the second calculated flow, f. determining a first threshold and producing a fault signal if the magnitude of the first comparison value is greater than the first threshold.

Preferably, the energy converter system comprises at least one fuel cell, which comprises an anode and a cathode. More than one fuel cell are preferably arranged as a fuel-cell stack. Furthermore, the gas preferably contains hydrogen. More preferably, more than 40 wt %, particularly preferably more than 90 wt %, and very particularly preferably more than 95 wt %, of the gas consists of hydrogen.

Preferably, the output variable represents an electrical current produced by the energy converter system. In fuel cells, in particular, the produced current depends directly on the gas consumption, and so the gas consumption can be ascertained on the basis of the tappable current.

Preferably, the output pressure of the pressure regulator corresponds to the anode pressure of the fuel cell; particularly preferably, the output pressure of the pressure regulator equals the anode pressure of the fuel cell.

Preferably, the gas metering valve comprises an injector. The input pressure of the pressure regulator is preferably between 5 bar and 30 bar, more preferably between 10 bar and 20 bar.

Advantageously, the pressure valve is controlled by means of pulse width modulation. The pulse width modulation preferably has a clock and the first calculated flow through the pressure regulator in step c) is determined on the basis of the measured input pressure of the pressure regulator, the measured output pressure of the pressure regulator and the clock.

Preferably, the gas requirement in step b) comprises a gas consumption, calculated on the basis of the output variable of the energy converter system, and a purge flow. The energy converter system may comprise a purge valve which, when open, allows gas to escape into the surroundings. The deliberately escaping gas, which is referred to as a purge flow, can be taken into account when determining the gas requirement in the energy converter system in order to avoid an erroneous production of the fault signal on account of the purge flow. To this end, the purge flow can be included in the calculation of the gas requirement in the energy converter system as a correction term.

As an alternative to taking account of the purge flow when calculating the gas requirement, the execution of the method for detecting a leak can be interrupted for as long as a purge valve is open. Preferably, an interruption of the execution of the method for detecting a leak can be restricted to a maximum time duration. By way of example, interrupting the method for detecting the leak can be restricted to a continuous time interval of 10 seconds and/or to a sum of 20 seconds per minute.

The pressure regulator has a characteristic that describes the mutual dependencies of physical variables of the pressure regulator. Thus, the flow through the pressure regulator can be represented as a function of the input pressure, the output pressure and, optionally, the clock of the pulse width modulation. The characteristic of the pressure regulator is known to a person skilled in the art as a result of precise manufacturing of the pressure regulator and knowledge of the employed pressure regulator. The accuracy of the characteristic, i.e., the theoretical description of the flow, which models the function of the pressure regulator, can be adapted and optimized by measuring the pressure regulator to be used; hence, it is also possible to adapt and optimize the determination of the first calculated flow. The optimization is preferably implemented by introducing further parameters into the theoretical model.

Preferably, the closed-loop control of the output pressure of the pressure regulator is implemented by means of a closed-loop regulation, initially independently of the characteristic, i.e., independently of the current input pressure, output pressure and, optionally, clock.

In order to determine the first calculated flow, the characteristic, and hence an expected flow through the pressure regulator, is modeled as a function of the input pressure, the output pressure and, optionally, the clock of the pulse width modulation. Preferably, the actuation values of the pulse width modulation are included in the characteristic for determining the first calculated flow.

The input pressure and/or the output pressure of the pressure regulator are preferably measured by redundant or monitored sensor systems.

Furthermore, the current operating state of the energy converter system is ascertained. To this end, the second calculated flow through the pressure regulator is determined, for the purposes of which possible gas sinks are advantageously added. The gas requirement, i.e., the sum of the gas sinks in the energy converter system, is preferably composed of the gas consumption and the purge flow. Preferably, the status of the purge valve, which may also be referred to as the position of the purge valve, is captured such that this information can be included in the determination of the second calculated flow in step d). The purge flow can be ascertained from the position of the purge valve, which is known in the energy converter system, more particularly to the control unit, and from the properties of the purge valve, more particularly the flow rates of the purge valve. The gas consumption is preferably calculated from the output variable of the energy converter system, more particularly from the emitted current of the fuel cell.

The first calculated flow, ascertained from the modeling on the basis of the input pressure, the output pressure and, optionally, the clock, is compared to the second calculated flow, which describes the current operating state of the energy converter system. If these flow values deviate from one another, with the deviation exceeding the defined first threshold, a fault signal is produced. The fault signal preferably triggers an output of a warning or a change in the mode of operation of the energy converter system, more particularly a shutdown of the gas supply.

The first threshold is advantageously a function of the anode pressure, a cathode pressure and/or of further specific parameters of the energy converter system, such as the age of the energy converter system, the gas temperature or a setting of an external ventilation, which is preferably comprised by the energy converter system. Alternatively, a fixed value can be chosen as the first threshold.

Advantageously, the first comparison value is formed by virtue of forming the difference between the first calculated flow and the second calculated flow. The absolute value of the input pressure and/or the absolute value of the output pressure, preferably the absolute value of the output pressure, can be taken into account when forming the first comparison value.

Preferably, a second threshold is determined, the first comparison value is captured over time interval and a second comparison value is formed from the first comparison value that was captured over the time interval, which may be 1 second, for example. Furthermore, the fault signal is preferably only produced in step f) if the magnitude of the second comparison value is greater than the second threshold.

By way of example, the second comparison value can be formed by forming the integral of a function of the first comparison value over time. The procedure can also be referred to as carrying out integrated debouncing.

The comparison with the second threshold can compensate a brief deviation of the system during dynamic processes and can avoid an erroneous production of the fault signal. An inappropriate fault signal in the case of actual tightness of the energy converter system is considered erroneous.

The method according to the invention allows a detection and quantification of a leak in an energy converter system, in particular a leak in an anode in a fuel cell system, during running operation. To this end, two comparable variables for the flow through the pressure regulator are ascertained without requiring a separate flow measuring device. Moreover, it is possible to dispense with an external sensor system for determining the gas, more particularly for detecting hydrogen outside of the fuel cell system. A more accurate diagnosis of the leak and a lower maintenance system are rendered possible.

BRIEF DESCRIPTION OF THE DRAWINGS

Embodiments of the invention are explained in more detail below on the basis of the drawing and the subsequent description.

In detail.

DETAILED DESCRIPTION

Figure 1:
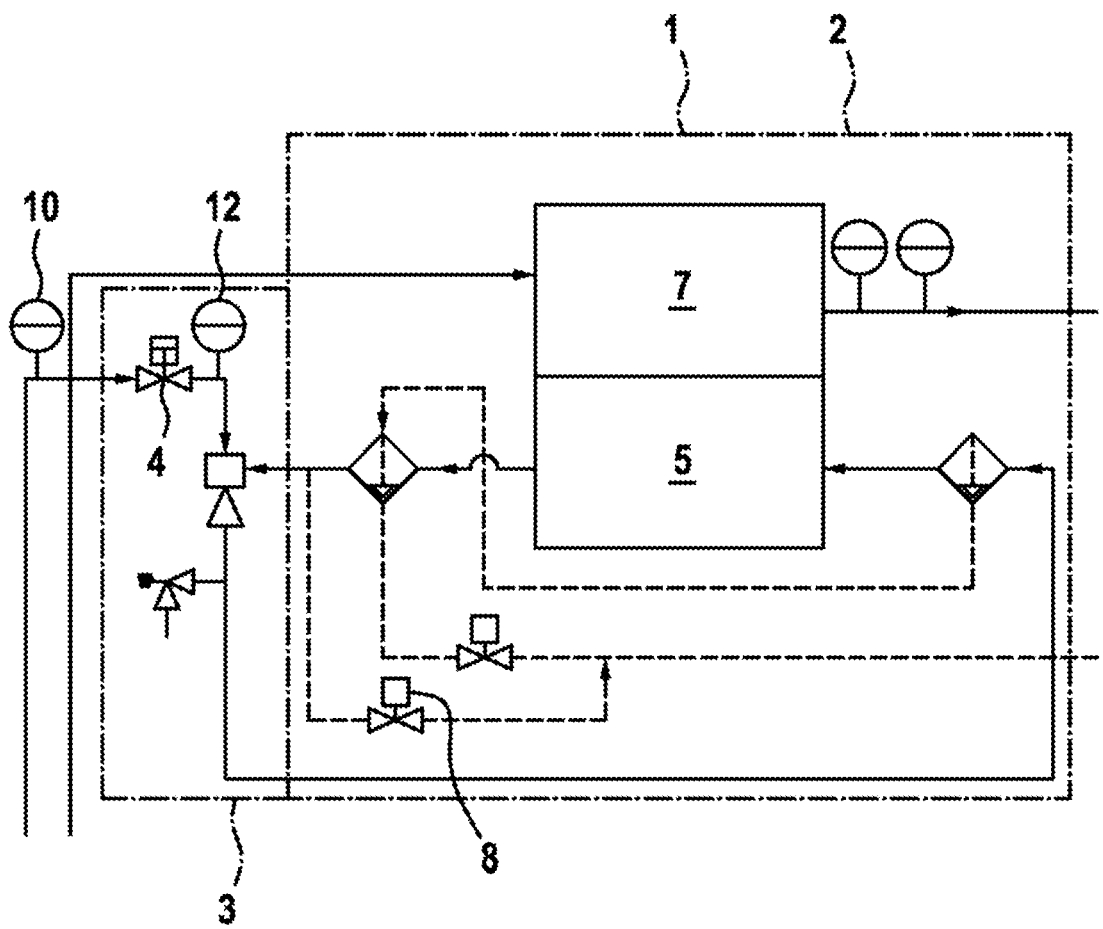
FIG. 1 shows a flow diagram of an energy converter system and a pressure regulator and FIG. 2 shows a schematic illustration of a course of the method according to the invention.

FIG. 1 shows an energy converter system 1 with a fuel cell system 2, which comprises an anode 5 and a cathode 7. The anode 5 contains a gas, more particularly hydrogen, the pressure of which is subject to closed-loop control by a pressure regulator 3, which comprises a gas metering valve 4. An output pressure 12 of the pressure regulator 3 is measured upstream of the anode 5. Further, the energy converter system 1 comprises a purge valve 8.

Figure 2:
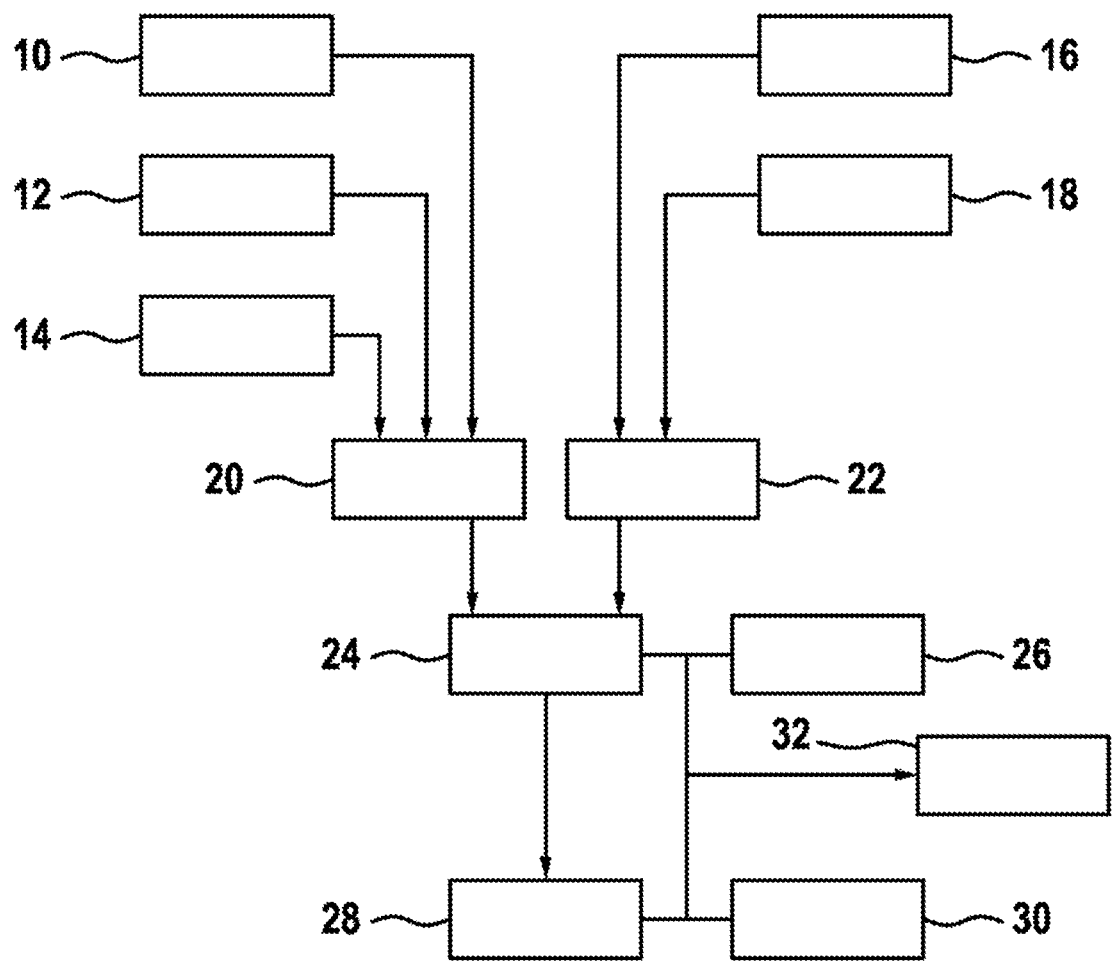

FIG. 2 schematically shows the course of a method according to the invention. Initially, an input pressure 10 and an output pressure 12 of the pressure regulator 3 are measured; further, a clock 14 of a pulse width modulation of the gas metering valve 4 of the pressure regulator 3 is known. A first calculated flow 20 is determined as a theoretical model by means of the characteristic of the pressure regulator 3 from the input pressure 10, the output pressure 12 and, optionally, the clock 14.

Furthermore, an output variable 16 of the energy converter system 1 is measured for each time at which the first calculated flow 20 is determined; in particular, a current produced by the fuel cell system 2 is measured as output variable 16.

Optionally, a purge flow 18 is ascertained, the latter being known from the properties and the status of the purge valve 8.

A second calculated flow 22 is determined from the output variable 16 and, optionally, the purge flow 18, said second calculated flow being compared with the first calculated flow 20 by forming a first comparison value 24, which, e.g., represents the difference between the first calculated flow 20 and the second calculated flow 22. Furthermore, the first comparison value 24 is compared with the first threshold 26, which may be fixed or may depend on the output pressure 12, more particularly on an anode pressure, a cathode pressure or further specific parameters of the energy converter system 1.

A fault signal 32 is produced if the absolute value of the first comparison value 24 is greater than the first threshold 26. Production of the fault signal 32 may optionally be inhibited by virtue of the first comparison value 24 being captured over a time interval and a second comparison value 28 being formed, said second comparison value being compared to a second threshold 30. No fault signal 32 is produced should the second comparison value 28 be smaller than the second threshold 30.

The invention is not restricted to the exemplary embodiments described here and the aspects highlighted therein. Rather, a multiplicity of developments which are within the scope of practice of a person skilled in the art are possible within the scope specified by the claims

The invention claimed is:

1. A method for detecting a leak in an energy converter system (1) containing gas, wherein a pressure regulator (3) is used for closed-loop control of a gas pressure in the energy converter system (1), the pressure regulator (3) including a gas metering valve (4) controlled by pulse width modulation, wherein the pulse width modulation has a clock (14), the method comprising the following steps:
 a. measuring an input pressure (10) of the pressure regulator (3) and measuring an output pressure (12) of the pressure regulator (3),
 b. measuring an output variable (16) of the energy converter system (1) and calculating a gas requirement in the energy converter system (1) based on the output variable (16) of the energy converter system (1),
 c. determining a first calculated flow (20) through the pressure regulator (3) based on the measured input pressure (10) of the pressure regulator (3), the measured output pressure (12) of the pressure regulator (3), and the clock,
 d. determining a second calculated flow (22) through the pressure regulator (3) based on of the gas requirement,
 e. comparing the first calculated flow (20) with the second calculated flow (22) by forming a first comparison value (24) from the first calculated flow (20) and the second calculated flow (22), and
 f. determining a first threshold (26) and producing a fault signal (32) when the magnitude of the first comparison value (24) is greater than the first threshold (26).

2. The method as claimed in claim 1, wherein the energy converter system (1) comprises at least one fuel cell comprising an anode (5) and a cathode (7), and the gas contains hydrogen.

3. The method as claimed in claim 2, wherein the output pressure (12) of the pressure regulator (3) corresponds to an anode pressure of the fuel cell.

4. The method as claimed in claim 2, wherein the first threshold (26) is a function of an anode pressure, a cathode pressure and/or model-specific parameters of the fuel cell.

5. The method as claimed in claim 1, wherein the output variable (16) represents an electric current produced by the energy converter system (1).

6. The method as claimed in claim 1, wherein the input pressure (10) of the pressure regulator (3) is between 5 bar and 30 bar.

7. The method as claimed in claim 1, wherein the gas requirement in step b) comprises a gas consumption, calculated based on the output variable (16) of the energy converter system (1), and a purge flow (18).

8. The method as claimed in claim 1, wherein the first comparison value (24) is the difference between the first calculated flow (20) and the second calculated flow (22).

9. The method as claimed in claim 1, wherein a second threshold (30) is determined, the first comparison value (24) is captured over a time interval and a second comparison value (28) is formed from the first comparison value (24) that was captured over the time interval and the fault signal (32) is only produced in step f) when the magnitude of the second comparison value (28) is greater than the second threshold (30).

* * * * *